No. 697,525. Patented Apr. 15, 1902.
D. McKAY.
BALL BEARING HUB.
(Application filed July 20, 1901.)
(No Model.)
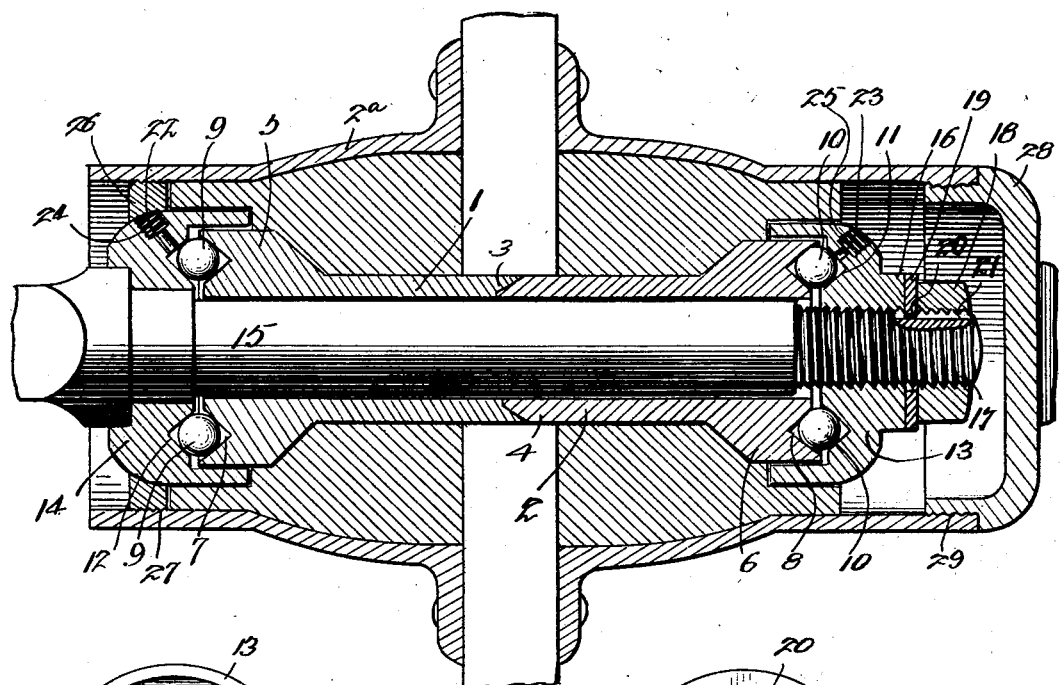
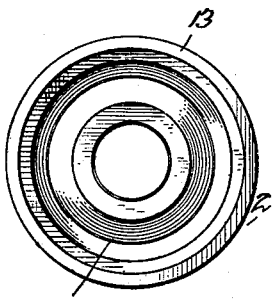
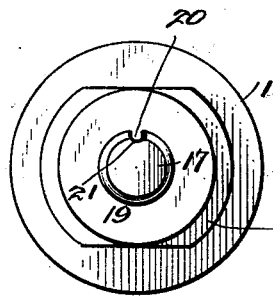
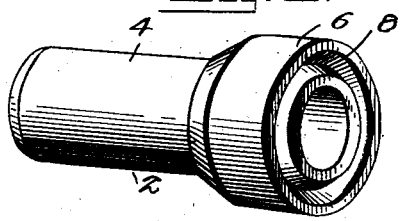
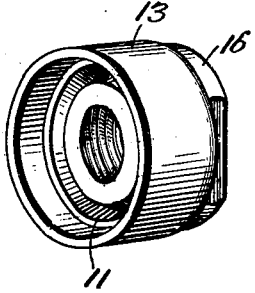
Witnesses
F. E. Alden
H. F. Riley
D. McKay Inventor
by C. A. Snow & Co.
Attorneys

UNITED STATES PATENT OFFICE.

DONALD McKAY, OF PRATTVILLE, ALABAMA.

BALL-BEARING HUB.

SPECIFICATION forming part of Letters Patent No. 697,525, dated April 15, 1902.

Application filed July 20, 1901. Serial No. 69,131. (No model.)

*To all whom it may concern:*

Be it known that I, DONALD McKAY, a citizen of the United States, residing at Prattville, in the county of Autauga and State of Alabama, have invented a new and useful Ball-Bearing Hub, of which the following is a specification.

The invention relates to improvements in ball-bearing hubs.

The object of the present invention is to improve the construction of ball-bearing hubs and to provide a simple, inexpensive, and efficient construction adapted to be applied to various kinds of hubs and capable of excluding dust and dirt from the interior and of reducing the friction to a minimum and of thereby lessening the draft.

A further object of the invention is to provide a ball-bearing of this character in which the wear may be readily taken up and which will prevent the spindle from becoming worn.

The invention consists in the construction and novel combination and arrangement of parts hereinafter fully described, illustrated in the accompanying drawings, and pointed out in the claim hereto appended.

In the drawings, Figure 1 is a longitudinal sectional view of a ball-bearing hub constructed in accordance with this invention. Fig. 2 is a detail perspective view of the outer section of the axle-box. Fig. 3 is a detail perspective view of the outer ball cup or collar. Fig. 4 is an end view of the same. Fig. 5 is an end view of the bearing, the hub, the outer cup, and the axle-nut being removed.

Like numerals of reference designate corresponding parts in all the figures of the drawings.

1 and 2 designate inner and outer sections of an axle-box fixed within a hub $2^a$, which may be of any desired size or construction, and the said inner and outer sections, which may be flanged or otherwise constructed to engage the hub, have their inner ends 3 and 4 fitted together, the inner end of the outer section being beveled, as illustrated in Fig. 2, and the inner end of the inner section being flared to receive the outer section. The outer ends 5 and 6 of the inner and outer sections of the axle-box are enlarged and provided with annular grooves 7 and 8 for the reception of inner and outer antifriction-balls 9 and 10, and the said grooves 7 and 8 are offset from the spindle and are V-shaped in cross-section. The antifriction-balls are also received within grooves 11 and 12 of outer and inner ball cups or collars 13 and 14, which are provided with annular flanges extending over the ends of the axle-box and forming recesses or sockets for the reception of the enlarged ends of the same. The grooves 11 and 12 are V-shaped in cross-section, and the balls which support the axle-box and the hub out of engagement with the spindle are of sufficient size and strength for this purpose and may be varied in diameter to suit the character of the hub to which they are to be applied. The inner ball-cup is shrunk on the inner portion of the spindle 15 and is stationary, and the outer ball-cup is interiorly threaded and is provided at its outer face with a suitable wrench-seat 16, and it serves as a nut for engaging the outer threaded end 17 of the spindle and is adapted to be screwed inward to adjust it to take up the wear.

The outer portion of the threaded end of the spindle receives an axle-nut 18, and a washer 19 is interposed between the axle-nut and the outer ball-cup and is provided with a lug 20, which engages a groove 21 of the spindle to prevent the washer from rotating. The groove 21 extends longitudinally of the threaded portion of the spindle, and the washer is adapted to be readily placed on and removed from the same. The axle-nut operates as a jam-nut, and the stationary washer prevents the outer ball-cup from rotating, and any tendency of the outer ball-cup to rotate cannot be communicated to the axle-nut.

The inner and outer ball-cups are provided at their upper portions with inclined oil-holes 22 and 23, having enlarged outer portions interiorly threaded for the reception of screw-plugs 24 and 25, which exclude dust from the oil-holes and prevent the same from becoming clogged. The oil-holes communicate with the grooves and enable the bearings to be readily lubricated.

The ball-cups are rounded at their outer faces, as shown, and the inner ball-cup has a washer 26 bearing against its rounded portion, as clearly shown in Fig. 1. This washer 26, which is designed to be constructed of felt or other suitable material, is provided at its outer periphery with screw-threads 27, and it is screwed into the inner end of the hub. The inner periphery of the felt washer is concave to conform to the configuration of the rounded outer portion of the inner ball-cup, and it covers the outer end of the screw-plug 24, and it excludes dust and dirt from the interior of the hub. The outer end of the hub is closed by a cap 28, provided with an exteriorly-threaded flange 29, which engages an interiorly-threaded portion of the outer end of the hub. The cap 28, which is provided with a polygonal outer portion to receive a wrench, has a shoulder for engaging the outer end of the hub, and it fits snugly against the same and absolutely prevents any dust from entering the outer end of the hub.

It will be seen that the ball-bearing hub is exceedingly simple and inexpensive in construction, that the axle-box is spaced from the spindle and is supported by the inner and outer annular series of antifriction-balls, and that the spindle does not receive any of the wear. It will also be clear that the friction is reduced to a minimum, that the draft is thereby lessened, and that wear or lost motion may be readily taken up by adjusting the outer ball-cup.

What I claim is—

In a device of the class described, the combination of a spindle, a hub provided at its ends with interior screw-threads, the inner and outer axle-box sections provided with outer enlarged ends having annular grooves, the inner and outer ball-cups provided with annular grooves, the inner ball-cup being fixed to the inner end of the spindle and the outer ball-cup being interiorly threaded for engaging the outer threaded end of the spindle, the antifriction-balls arranged in the annular grooves and supporting the axle-box sections out of contact with the spindle, the axle-nut, the washer interposed between the nut and the outer ball-cup and interlocked with the spindle, the outer cap closing the outer end of the hub and engaging the outer screw-threads of the same, and the inner washer engaging the screw-threads of the inner end of the hub and fitting against the inner ball-cup and closing the inner end of the hub, substantially as described.

In testimony that I claim the foregoing as my own I have hereto affixed my signature in the presence of two witnesses.

DONALD McKAY.

Witnesses:
A. N. OLDERSON,
J. M. TIMMERMAN.